Oct. 4, 1966    T. S. MALEWSKI    3,276,938
MACHINE FOR LAMINATING WEBS OF MATERIAL
Filed May 25, 1961    3 Sheets-Sheet 1

INVENTOR.
THEODORE S. MALEWSKI
BY John P. Chandler
HIS ATTORNEY.

Oct. 4, 1966 T. S. MALEWSKI 3,276,938
MACHINE FOR LAMINATING WEBS OF MATERIAL
Filed May 25, 1961 3 Sheets-Sheet 2

INVENTOR.
THEODORE S. MALEWSKI
BY John P. Chandler
HIS ATTORNEY.

Oct. 4, 1966  T. S. MALEWSKI  3,276,938
MACHINE FOR LAMINATING WEBS OF MATERIAL
Filed May 25, 1961  3 Sheets-Sheet 3

INVENTOR.
THEODORE S. MALEWSKI
BY John P. Chandler
HIS ATTORNEY.

United States Patent Office 3,276,938
Patented Oct. 4, 1966

3,276,938
MACHINE FOR LAMINATING WEBS OF MATERIAL
Theodore S. Malewski, 29 Greenpoint Ave., Brooklyn, N.Y.
Filed May 25, 1961, Ser. No. 112,556
10 Claims. (Cl. 156—494)

This invention relates to a machine for the lamination of webs of material by the use of heat applied to one of the webs or by the use of adhesives and/or heat in the case of two and three layer laminations.

An important object of the present invention is to provide one basic high-speed machine which can perform these operations on various types of materials and wherein the machine can be quickly converted to perform a second type of operation after a run of one type of material has been completed.

Another object of the invention is to provide a machine which avoids undue stretching of the materials either longitudinally or laterally. In some instances any actual stretching beyond that necessary to eliminate the wrinkles is undesirable and the absence of uniform tensioning means for given types of materials produces inferior products which must be sold at a lower price as rejects or "seconds."

The machine of the present invention is particularly designed for laminating materials where one of the webs is a foamed plastic, and controlled heat by means of an open gas flame is applied to one side to fuse the surface and cause it instantly to adhere to a second material such as fabric. One laminated material currently in demand has a layer of polyurethane foam and the machine of the present invention is especially suited to produce such a material since it has means for chilling one surface of the foamed plastic simultaneously with fusing the opposite side just in advance of the uniting of the two materials between two combining or pressure rollers.

Another object of the invention is the provision of a machine which can run at unusually high speeds and wherein no stoppages need occur when the supply rolls are exhausted, nor when the roll of finished material has reached a desired yardage and a new take-off roll started.

The feed rolls of the starting materials can be readily spliced while the machine is running and when the finished roll has reached its required yardage or diameter, the continuously running laminated material is fed to a novel compensator which accumulates the finished material during the time required by the operator to unhurriedly cut the web transversely and affix the now leading end to a new tube or core and place it in driven relation in the finished roll winding area.

Most machines of this general character are suited for the production of only one type of laminated material and the machines are necessarily very costly. Conversion of the instant machine to one applying one of the newer adhesives, as well as one capable of laminating three layers with varying combinations of bonding means can be effected in a matter of minutes so that one of these high speed machines may take care of the entire production in a reasonably sized plant doing general laminating work.

In the drawing:

FIG. 5 shows in fragmentary form a suggested driving arrangement for such of the rollers as are positively driven;

Figure 1:
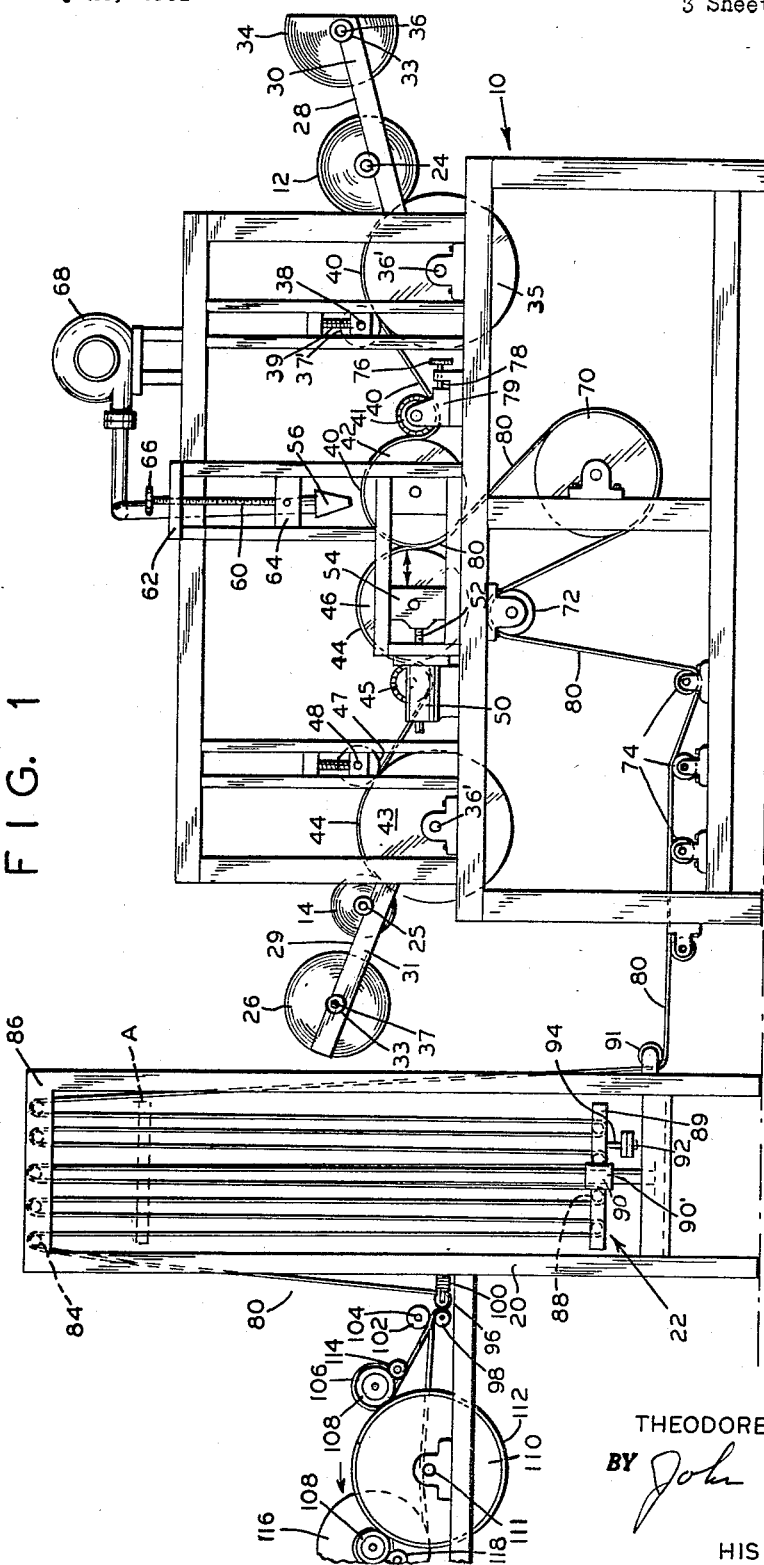
FIG. 1 is a side elevation of a machine showing one embodiment of the present invention, and arranged to laminate two webs of material.

Referring now to FIG. 1, a frame 10 supports most of the components of the machine including two supply rolls 12 and 14 of web materials to be laminated together. For convenience of operation the rewind roll 116 is mounted upon a separate frame 20 which also includes a web compensating mechanism generally indicated 22.

The supply rolls 12 and 14 which are unwound, are carried upon shafts 24 and 25, respectively, which roll upon inclined edges 28 and 29 of arms 30 and 31, respectively. When supply rolls 12 and 14 are exhausted, new supply rolls 26 and 34 are ready for splicing at the trailing ends of the supply rolls 12 and 14. Arms 30 and 31 are formed at their outer ends with slots 33 into which the shafts 36 and 37, on which the new rolls are mounted, are held in the spaced relation to supply rolls 12 and 14. The roll 12 is urged by gravity down the incline 28 against a hollow material conveying or driving roller 35, carried on shaft 36', over which the web 40 is fed from the roll 12. A pinch roller 37' is mounted on shaft 38 which is urged by spring 39 against driving roller 35 for use in securing an intimate contact between the trailing and leading ends of the old and new rolls, respectively, during the splicing operation later to be described. The web 40 from supply roll 12 passes beneath a web tentering roller or "slot expander" 41 which is surface driven from a large combining roller 42 over which the web is carried. This slot expander is standard equipment on web laminating machines and has a series of split longitudinal splines which move axially outwardly during contact with the web and this smooths out all wrinkles and extends the web to its full width without appreciable stretching.

Similarly, the roll 14 is urged against another hollow material conveying roller 43 over which the web 44 is fed from the supply roll 14. The web 44 then passes beneath slot expander 45 which is surface driven from another large combining roller 46, over which the web is carried. Material driving rollers 35 and 43 are hollow and have a connection through their shafts to a fluid heating medium which is used when laminating certain types of materials. These rollers could be cooled as well. Roller 43 has a similar pinch roller 47 carried on shaft 48 which is also adjustably spring urged against the roller 43.

It will be apparent that the webs 40 and 44 are firmly pressed together as they pass between the large combining rollers 42 and 46. The amount of pressure which is applied to the webs at the nip is predetermined and controlled through an air cylinder 50 which is connected to a compressed air supply, not shown. A rod 52 connects the cylinder piston with a slideable journal 54 on which the roller 46 is mounted for movement against or away from the roller 42.

As the web 40 is carried over the roller 42, it passes beneath a gas ribbon burner 56 which heats the surface of the web 40 to a tacky or fused condition so that it will bond with the web 44 as it is pressed between the rollers 42 and 46. The amount of heat applied to the web 40 depends upon a number of factors including the speed with which the web travels past the burner; the distance of the burner from the surface of the web 40; and the heat of the flame. This distance can be adjusted by means of a screw 60 held in a plate 62 against axial movement and threaded into a slidable block 64 to which the burner 56 is attached. A hand knob 66 permits manual adjustment of the burner 56. A blower 68 furnishes air for mixture with the gas, giving a further control of the heat. By shutting off the gas supply air alone from the blower may be used for cooling the web under certain conditions. The fusing of the material to a controlled depth may thus be readily achieved and in some instances it may be desirable to partially melt the material all the way through.

A cooling roller 70 is journalled in the frame 10 and is of hollow construction for admitting a cooling fluid through a rotating pipe union (not shown). An idler roller 72 is mounted in such manner relative to the cooling roller 70 as to permit the web to remain in contact through more than 180 degrees of rotation of the roller 70, thereby effecting maximum cooling of the web. From the idler roller 72 the web passes over a series of rollers 74 during which time it is finally cooled by the air before passing into the compensator 22 and the rewinding apparatus.

It will be noted that the arrangement of rollers is such that the maximum space between adjacent rollers need not be more than twelve inches so that the suspension of the material being laminated is kept to a minimum distance thus avoiding stretching of the materials.

In operation a roll 14 of fabric is threaded through the machine and a second roll 12 of a fabric of the polyester type such as polyurethane foam is threaded through, indicated by webs 44 and 40 respectively. The valve controlling feeding of gas to the burner 56 is opened and the gas ignited. The rollers are driven by a motor through suitable chains, sprockets and gears in proper timed relationship to prevent stretching or binding of the web. Each of the rollers 35, 42, 46, 43 and 70 are driven individually to accomplish this result. The two slot expanders 41 and 45, however, are driven by frictional contact with the respective webs 40 and 44 and rollers 42 and 43. The function of the slot expanders is to iron out any wrinkles which may occur in the webs before entering between the large combining rollers for lamination. The pressure of the slot expanders against the webs and rollers is manually adjustable by turning the knob 76 and moving a block 79, by virtue of the rotation of a screw 78 in a threaded hole. The polyurethane web 40 is carried over the roller 42 and past the burner 56 where it is heated sufficiently to become tacky and thus adhere to the web 44 as it is pressed together with web 40 when passing between the large combining rollers 42 and 46. In the event that the web 44 is a fabric of material other than a polyester type it may be necessary to heat the fabric by passing steam into the rollers 35 and 42. In certain instances steam temperatures as high as 350 degrees may be required. Also, in most instances, and especially if the web 40 is polyurethane foam and relatively thin, the roller 42 must be chilled by circulating cold water therethrough so that the side of the web 40 which is adjacent the roller 39 will not become tacky and will not stick to the roller. After the webs 40 and 44 have been pressed together, in heated condition, between the combining rollers 42 and 46 they emerge as one web 80 which then passes over an internally cooled roller 70 to chill and set the polyurethane foam to the fabric. From roller 70 the web 80 passes over several rollers 72 and 74 during which travel they become further cooled by the natural circulation of air.

It will be noted that the burner 56 and blower 68 are interconnected in such a manner that while the burner is operating the blower blows air past the burner to form a hot air jet which is directed upon the web 40 as it travels along. However, if for any reason the web 40 should stop, a safety switch is arranged to turn off the burner immediately to prevent burning the web. The blower continues to run, blowing cold air in place of the hot jet.

The compensator which accumulates the finished material during changing of the winding roll includes an upright frame 20 having a plurality of small upper rollers 84 extending the full width of the material and journalled for free rotation in upper horizontal frame member 86 and similar lower rollers 88 journalled in a floating frame 89 which has a collar 90 at each end carried on a fixed vertical tubular guide 90' secured to the frame.

The material passes under final idler roller 91 and is then threaded alternately over the upper and lower rollers 84 and 88. The amount of tension of the material 80 during its passage through the compensator depends upon the weight of floating frame 89 and this may be increased by separate weights 92 added to a rod 94.

Leaving the final upper roller in the compensator the finished web 80 traverses around a rubber roller 96 and thence over a hardened steel roller 98, which is driven. Rubber roller 96 is not driven but is urged by an adjustable spring 100 against the steel roller. A pair of rotary knives 102 are mounted in spaced, adjusted relation on a fixed transverse bar 104 and trim the edges of the finished material as it moves over the steel roller.

Figure 2:
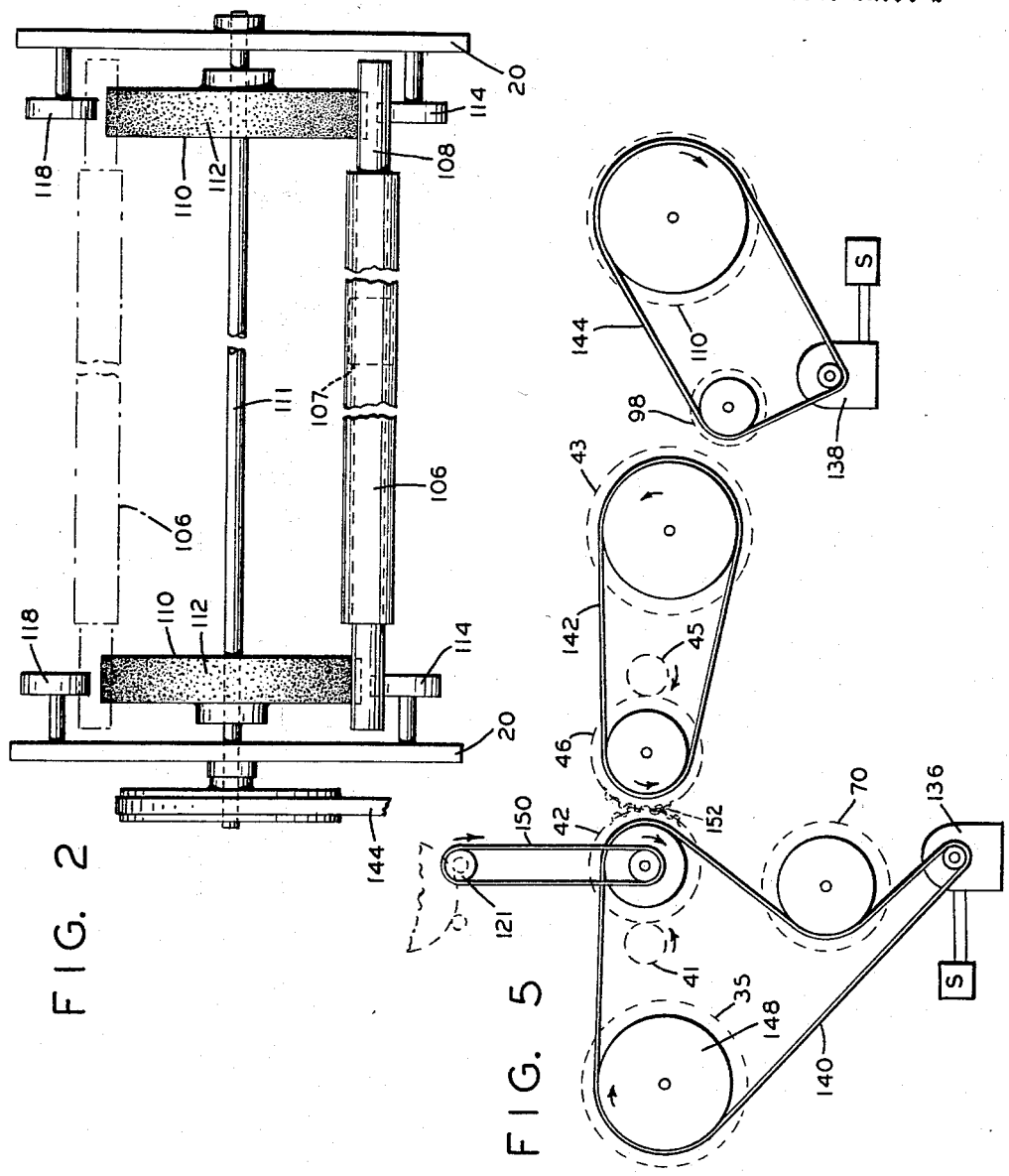
FIG. 2 is a broken plan view of the machine.

Referring now to the plan view of FIG. 2, the web is wrapped around a tube 106 which is received in driving relation by any suitable key or clutch means 107 on a tubular metal shaft 108 which is supported at ends on a pair of drums 110 on a shaft 111 journalled on frame 20, the drums being spaced apart a greater distance than the maximum width of the material. These drums drive the tubular shaft 108 by surface contact therewith and to effect the desired frictional contact therewith they have a non-smooth facing 112. Ordinary automobile brake lining may be used for this purpose. The shell is supported on its opposite side by a pair of ball-bearing wheels 114 and another pair 118. These wheels are of the type commonly used in roller skates.

Tube 106 which is keyed to shaft 108 by key means 107 is first placed in the position shown in full lines in FIG. 2 which is closest to the compensating mechanism 22. In this position the shaft is supported on drums 110 and small wheels 114, the drums being driven. The material is wrapped around tube 106 and the machine is started, causing the material to form a roll on tube 106. After a roll of reasonable size has been formed, the shaft 108 together with the roll is transferred to the position shown in broken lines in FIG. 2 where winding is continued until the desired roll diameter is formed. The machine is now stopped, the web cut and the leading edge is wrapped around a new tube 106 in the position shown in full lines where the operation is continued.

When the winding roll of material has reached a desired length or diameter, the drive means for drums 110 and roller 98 are discontinued by opening a switch controlling operation of this motor. The fully wound roll is manually moved over to the position shown at 116. The shell is still supported on one side of its axis by drums 110 and on the other side by another roller bearing 118. The web is now cut and the now leading end is affixed to another tube 106 which is placed in the starting position shown at the right. During these operations the section of web 80 below the upper compensator roll 84 is held tightly enough between rollers 96 and 98, because of spring 100, that no reverse travel can occur.

Vertically movable frame 89 of the compensator normally occupies a position shown in broken lines at A during normal running operation. During changing the rolls no material is fed beyond rollers 96–98 so the material starts to accumulate in the compensator and is kept under the same tension, by the weight of frame 89, as it was during running. The roll changing operation is generally accomplished before the frame 89 has moved downwardly more than two-thirds of its maximum travel.

As soon as the new tube, with the material wrapped around it, and its supporting shell, are in place, the motor is again started and driven at a faster than normal speed until floating frame 89 has reached point A at which time normal speed is resumed.

Figure 3:
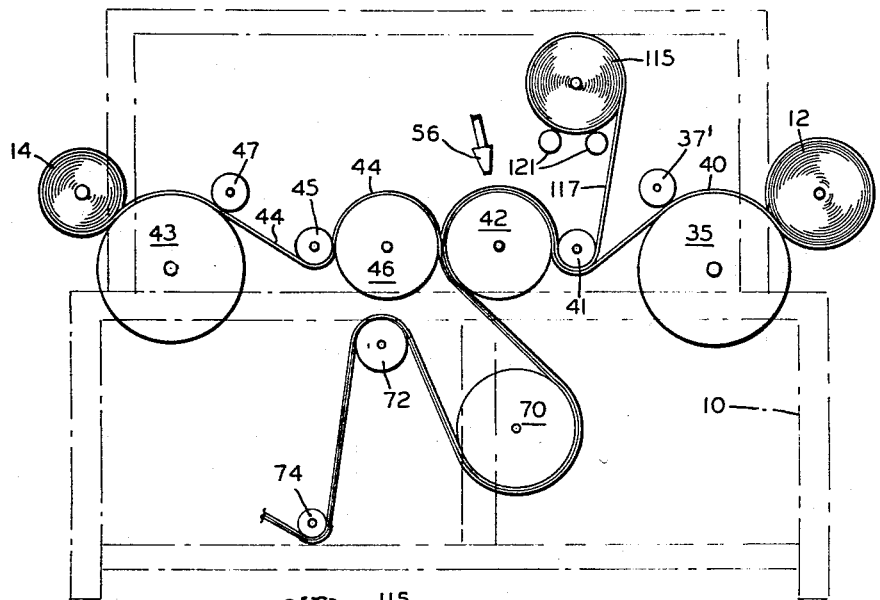
FIG. 3 is a view similar to FIG. 1 showing a fragmentary portion of the machine with an added material feed roll for making a three-layer laminated material.

If it is desired to produce a three-ply laminated web such as indicated by FIG. 3, a third roll of any compatible material 117 can be introduced in a manner indicated by FIG. 2. This material can be of a thickness in the order of .002″ or greater. It is usually necessary, when running the three web laminating process to heat the webs 40 and 44 by introducing steam internally into the rollers 35, 42 and 46. The third roll 115 is carried on a shaft and journalled for rotation on rollers 121, one of which may be driven.

It may be desirable in certain instances to laminate a coarse woven fabric together with a polyester plastic. It will be noted by referring to FIG. 4 that there has been added to the machine an adhesive applicator 130 consisting of a reservoir 122 and rollers 124, one of which is an applicator roller. In this arrangement for wet lamination the web 40 is threaded around additional rollers 126 and 128 to direct it between applicator rollers 124. The adhesive to be used for this purpose is the dry-cleanable type and gives a much better bond with use of the least amount of polyurethane foam resulting in a less expensive product and which has excellent insulation qualities. In cases where adhesive is used, the web 40 may be paper or other sheet material.

Figure 4:
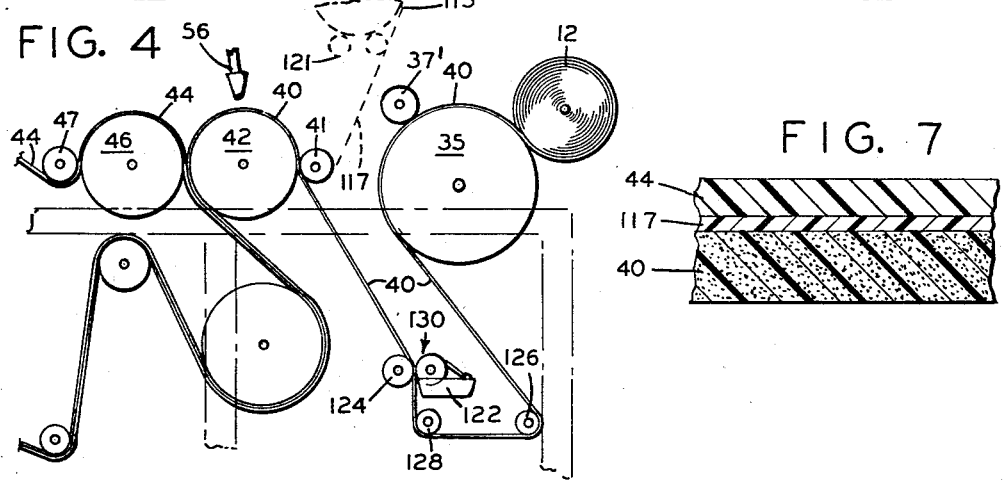
FIG. 4 is a view similar to FIG. 1 but including an adhesive applicator.
Figure 7:
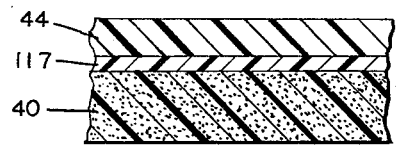
FIG. 7 shows an enlarged cross-section of a three-layer lamination.
Figure 6:
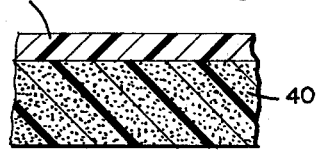
FIG. 6 shows an enlarged cross-section of a typical two-layer lamination.

There is also shown in FIG. 4 roll 115 in broken lines and the web 117 therefrom is shown, also in broken lines, as passing below the slot expander where it unites with web 40. In the event that the third web 117 is not being used the adhesively coated web 40 should pass above and not below the slot expander 41. In such an arrangement the slot expander could be removed since its effectiveness is generally reduced if the material is not urged against it by another roller.

It was earlier pointed out that certain of the rollers are driven by frictional contact with the material which latter are moved by positively driven rollers. Two motors 136 and 138 are used for the latter, one for driving rollers 35, 42, 46, 43 and 70, and the other for driving rollers 110 and 98, the latter having speed adjusting means for increasing speed of travel of finished web 80 after it leaves the compensator following changing of the winding rolls.

Speed of surface travel of the several rollers is such as to avoid stretching of the material other than that necessary to extend it to its full length. The surface speed of combining rollers 42 and 46 should be very slightly faster (½ to 1%) than feed rollers 35–43 in order to assure the material assuming its full length. Chill roller 70 is driven at the same surface speed as the combining rollers. A chain or belt drive may be used but belts 140, 142 and 144 are indicated in the schematic showing of the driving arrangement in FIG. 5. This is a view of the arrangement from the opposite side of the machine shown in FIG. 1, and drums 148 are shown as being associated with each roller and the combining rollers have intermeshing gears 152. The slot expanders are driven by frictional contact with the combining rollers and if a third material roll 115 is used this roll is driven by a belt 150 from a drum or combining roller 42. Motor 138 has speed adjusting means for the purpose earlier set forth. No effort at accuracy of diameter in the drums or sprockets is attempted since changing a roller for one of different diameter requires a different sized sprocket.

The surface speed of drums 110 is very slightly greater than that of steel roller 98 in order to cause a tight wind of the finished material on tube 106. The r.p.m. of this tube reduces as the roll increases in diameter and must therefore be driven faster when the roll is small but the friction drive between the drums and the tubular shell 108 takes care of this.

The extreme flexibility of the machine of the present invention is well illustrated by the interchange of rollers of different sizes and characteristics including embossing rollers which can be easily made and no important change in the operation besides selecting sprockets and gears from proper speed of surface travel. In some instances a roll of printed fabric carried have a "right" and "wrong" side and instead of re-winding the roll to bring the proper side in contact with roller 43, an idler could be positioned between roll 14 and roller 43. Also in some instances the materials do not require any tentering so the slot expanders 41 and 45 can be replaced by simple idlers.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and ranges of equivalency of the claims are intended to be included therein.

I claim:

1. A machine for laminating webs of flexible material from supply rolls and comprising, in combination: a frame, hollow driving rollers journalled at opposite ends of the frame over which the webs travel, means for supporting the supply rolls in driving contact with the driving rollers, a pair of hollow combining rollers over which the webs travel for uniting said webs, first and second shafts on which said last mentioned rollers are carried, one of said shafts having a fixed axis and the other being movable towards and away from the first roller, and fluid means including an air cylinder and a piston connected with the second shaft for varying the pressure between the combining rollers, web tentering rollers under which the webs travel, an open gas flame burner above one of the combining rollers, a chilling roller below the combining rollers, means for cooling the surface of the chilling roller, and means for driving the driving rollers, the combining rollers and the chilling roller.

2. The structure recited in claim 1 wherein means are provided for effecting travel of the laminated material over more than one-half the periphery of the chilling roller.

3. The structure recited in claim 1 wherein means are provided for driving the combining rollers and chilling roller at a speed slightly in excess of the speed of the feed rollers.

4. The structure recited in claim 1 wherein the web tentering rollers are driven by frictional contact with the combining rollers.

5. The structure recited in claim 1 wherein means are provided for selectively heating and for cooling the feed rollers and the combining rollers.

6. The structure recited in claim 1 wherein spring urged pinch rollers are journalled in the frame above the feed rollers for splicing new supply rolls to the old.

7. The structure recited in claim 1 wherein means are provided for passing cooling air through the burner when travel of the material stops.

8. The structure recited in claim 1 wherein an adhesive applying roller is journalled in the frame below one of the feed rollers for applying adhesive to one of the webs.

9. The structure recited in claim 1 wherein the supporting means for the supply rolls are inclined in the direction of the feed rollers and receive new supply rolls to replace the exhausted ones.

10. The structure recited in claim 1 wherein means are provided for supporting a third roll of material on the frame for effecting a three-ply lamination, and driving means for unwinding material from said third roll.

References Cited by the Examiner

UNITED STATES PATENTS

| | | | |
|---|---|---|---|
| 1,653,356 | 12/1927 | Freeman et al. | 156—324 |
| 2,062,008 | 11/1936 | Lewis et al. | 242—58.1 |
| 2,957,793 | 10/1960 | Dickey | 154 |
| 3,020,194 | 2/1962 | Jerothe | 156—555 XR |
| 3,057,766 | 10/1962 | Dickey | 156—497 |
| 3,084,425 | 4/1963 | Erskine | 242—58.1 |

FOREIGN PATENTS 418,722  10/1934  Great Britain.

EARL M. BERGERT, *Primary Examiner.*

H. F. EPSTEIN, M. E. ROGERS, R. I. SMITH,
*Assistant Examiners.*